(12) United States Patent
Knapton et al.

(10) Patent No.: US 12,228,983 B2
(45) Date of Patent: Feb. 18, 2025

(54) SYSTEMS AND METHODS FOR CONTROLLING OPERATION OF A POWER SUPPLY UNIT (PSU) DURING A LOW POWER STATE

(71) Applicant: DELL PRODUCTS L.P., Round Rock, TX (US)

(72) Inventors: Edward Douglas Knapton, Pflugerville, TX (US); Yung-Chang Chang, New Taipei (TW); Ya-Tang Hsieh, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 18/134,510

(22) Filed: Apr. 13, 2023

(65) Prior Publication Data
US 2024/0345641 A1  Oct. 17, 2024

(51) Int. Cl.
| | |
|---|---|
| *G06F 1/26* | (2006.01) |
| *G06F 1/32* | (2019.01) |
| *G06F 1/3203* | (2019.01) |
| *G06F 1/3234* | (2019.01) |
| *G06F 1/3287* | (2019.01) |
| *G06F 9/4401* | (2018.01) |

(52) U.S. Cl.
CPC .............. *G06F 1/26* (2013.01); *G06F 1/3287* (2013.01); *G06F 1/32* (2013.01); *G06F 1/3203* (2013.01); *G06F 1/3234* (2013.01); *G06F 9/4418* (2013.01)

(58) Field of Classification Search
CPC ........ G06F 1/3203; G06F 1/26; G06F 1/3234; G06F 1/3287; G06F 1/32; G06F 9/4418
USPC .................................. 713/300, 320, 323
See application file for complete search history.

(56) References Cited

U.S. PATENT DOCUMENTS

| | | | |
|---|---|---|---|
| 2008/0195874 A1* | 8/2008 | Zhou ..................... | H02J 9/005 713/320 |
| 2009/0010671 A1* | 1/2009 | Hashimoto .......... | G06F 1/3203 713/300 |

(Continued)

OTHER PUBLICATIONS

UEFI Forum, Inc., "Advanced Configuration And Power Interface (ACPI) Specification", Release 6.5, Aug. 2022, 1126 pgs.

(Continued)

*Primary Examiner* — Ji H Bae
(74) *Attorney, Agent, or Firm* — Egan, Enders & Huston LLP.

(57) ABSTRACT

Systems and methods are provided that may be implemented to control operation of a power supply unit (PSU) during a low power state. The disclosed systems and methods may be implemented to control operation of a PSU relay included within the PSU, while the information handling system is operating in a low power state, e.g., such as the modern standby (S0ix) state. The disclosed systems and methods may also be implemented to provide intelligent PSU relay control that may be utilized to control operation of the PSU relay when the information handling system is entering, operating within, and exiting the modern standby (S0ix) state. This intelligent PSU relay control may include at least two operating modes: a modern standby mode and a normal mode of operation, and may be implemented to ensure that the PSU relay remains off during modern standby and returns to normal relay operation upon exiting modern standby.

20 Claims, 8 Drawing Sheets

(56) References Cited

U.S. PATENT DOCUMENTS

| | | | | |
|---|---|---|---|---|
| 2013/0113292 A1* | 5/2013 | Inukai | ............... | H02M 3/33538 |
| | | | | 713/320 |
| 2016/0006895 A1* | 1/2016 | Hikichi | ................ | G06F 1/3293 |
| | | | | 358/1.13 |
| 2020/0341528 A1* | 10/2020 | Bikumala | ............ | H02H 1/0092 |

OTHER PUBLICATIONS

Intel, "Desktop Platform Form Factors Power Supply" Design Guide, Jun. 2018, 67 pgs.
Microsoft, "What Is Modern Standby", Mar. 2021, 4 pgs.
Microsoft, "Modern Standby vs S3", Nov. 2020, 3 pgs.
"ATX12Vo (12V Only) Desktop Power Supply, Reliability-PS_ON# Toggle for S0ix Mode (Required)", Design Guide, Obtained from Internet Mar. 31, 2023, 2 pgs.
Microsoft, "System Power States", Feb. 9, 2023, 8 pgs.
Microsoft, "Platform Design for Modern Standby", May 19, 2021, 4 pgs.
Microsoft, "What Is Modern Standby? Find Out If Your Windows PC Supports It", Jan. 3, 2022, 4 pgs.

* cited by examiner

SYSTEMS AND METHODS FOR CONTROLLING OPERATION OF A POWER SUPPLY UNIT (PSU) DURING A LOW POWER STATE

FIELD

This application relates to information handling systems and, more particularly, to power supply units (PSUs) for information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computers, an internal power supply unit (PSU) is utilized to supply electrical power via a plurality of voltage rails (e.g., +3.3 VDC, +5 VDC, +12 VDC and −12 VDC voltage rails) to various power-consuming hardware components of the system (e.g., system motherboard, processors, memory, storage devices, video cards, network cards, peripherals and other external devices, etc.). The PSU converts alternating current (AC) received from the AC mains to the direct current (DC) used to operate the power-consuming hardware components. The PSU is typically controlled by an active low power supply on (PS_ON #) signal, which is supplied to the PSU from the system motherboard or silicon on chip (SoC) to cause control of a relay in the PSU that itself is electrically coupled to control (i.e., allow or disallow) flow of DC current to voltage rails from the PSU. The PS_ON #signal is asserted (i.e., pulled low) to turn on the PSU relay to provide DC current via voltage rails to various computer components, and the PS_ON #signal is de-asserted (i.e., pulled high) to turn off the PSU relay to discontinue DC current flow via voltage rails to these various computer components. A +5V standby (SB) voltage rail is typically provided to support standby functions and power certain peripherals when the computer is in a low power state (e.g., standby, sleep and hibernation states). When the PS_ON #signal is de-asserted (i.e., pulled high), the PSU relay is turned off and the voltage rails are held at zero potential to prevent DC current from being supplied to the computer components. The PS_ON #signal controlling the PSU relay has no effect on the +5VSB standby voltage rail, which is always enabled whenever power is available to the PSU.

A computer may alternate between a variety of power states defined by the Advanced Configuration and Power Interface (ACPI) specification. The ACPI specification is an open standard that defines power states for ACPI-compliant systems, processors and devices. The ACPI specification defines four global "Gx" power states (G0-G3) and six sleep "Sx" states (S0-S5) for ACPI-compliant systems. When an ACPI-compliant computer is operating in the active working (G0/S0) state, electrical power is supplied to the computer and the CPU is executing program instructions. Individual devices within the computer can be placed in low-power (Dx) device states and processors can be placed in low-power (Cx) processor states, if they are not actively being used when the system is operating in the working (S0) state. However, any device/processor that is turned off by the system can be turned on with relatively low latency. When the computer is idle or the user has pressed the power button, the operating system (OS) will transition the computer into one of several low power states. The low power states traditionally include sleep states (S1-S3), hibernation (S4) and soft-off (S5), and differ in power consumption, what events can arouse the system to the working (S0) state, and how long this takes.

Some computers provide support for a low power state referred to as the modern standby (S0ix) state or low power S0 idle state. The modern standby (S0ix) state includes screen off and sleep states and provides an alternative to the traditional S3 sleep state. While modern standby (S0ix) sleep states look similar to the traditional S3 sleep state, the system power can be toggled on/off while operating in modern standby. This allows background activity to continue while the system appears to be "off" and provides a simplified wake process and faster transition from a lower power state to the active working (S0) state. Systems that support the modern standby (S0ix) state do not support sleep states S1-S3.

Computers that support modern standby can periodically wake from the modern standby (S0ix) state to allow for background activity (such as, e.g., executing critical system tasks or application background tasks). In conventional computers, the PS_ON #signal is periodically toggled on/off to control the PSU relay during the modern standby (S0ix) state to allow background activity to be executed. For example, the PS_ON #signal may be periodically toggled "on" for 5 seconds and "off" for 180 seconds when the system is operating in the modern standby (S0ix) state. In traditional S3 sleep state, power transitions correspond to obvious system power up/down transitions, and the PS_ON #signal toggles off/on only once to enter/exit the S3 sleep state and only causes an audible PSU relay click when a user anticipates a system response. However, the repetitive toggling of the PS_ON #signal during the modern standby (S0ix) state results in frequent power state transitions, which may increase power consumption, have a negative impact on PSU reliability and be a source of end user annoyance, due to the audible clicking sounds produced when the PSU relay turns on/off.

It is known to delay the PSU relay turn-on time by two seconds in an attempt to prevent the PSU relay from frequently cycling on and off due to toggling of the PS_ON #signal during modern standby (S0ix) state. In this conventional implementation, the PSU relay will remain off if the PSU_ON #signal toggles from off to on, and then back to off, in two seconds or less. However, if the PSU_ON #signal toggles to on for greater than two seconds, then the PSU relay will still cycle on and off during modern standby (S0ix) state and cause audible clicking sounds produced when the PSU relay turns on/off.

SUMMARY

Disclosed herein are systems and methods that may be implemented to control operation of a power supply unit (PSU) during a low power state. In one embodiment, the disclosed systems and methods may be implemented to control operation of a PSU relay included within the PSU, while the information handling system is operating in a low power state, e.g., such as the modern standby (S0ix) state. In one exemplary embodiment, the disclosed systems and methods may be implemented to provide an intelligent or smart PSU relay control mechanism that may be utilized to control operation of the PSU relay when the information handling system is entering, operating within, and exiting the modern standby (S0ix) state. In this embodiment, the intelligent PSU relay control mechanism may include at least two operating modes: a modern standby mode and a normal mode of operation, and may be implemented to ensure that the PSU relay remains off during modern standby and returns to normal relay operation upon exiting modern standby.

In one embodiment of the disclosed systems and methods, the disclosed intelligent PSU relay control mechanism may operate in the modern standby mode by supplying a control signal to the PSU relay to turn off the PSU relay, and ensure that the PSU relay remains off, while the information handling system operates in the modern standby (S0ix) state. When the information handling system exits the modern standby (S0ix) state and enters an active working (S0) state, the intelligent PSU relay control mechanism disclosed herein returns to the normal mode of operation and uses the power supply on (PS_ON #) signal to control operation of the PSU relay. As so implemented, this embodiment advantageously prevents the PSU relay from toggling on and off (on/off) during modern standby state, and as a consequence, reduces power consumption, improves PSU reliability (by maintaining a PSU steady state during modern standby) and eliminates the audible noise (e.g., clicking) that would otherwise be produced by such toggling during modern standby state operation on a conventional computer system.

In one exemplary embodiment of the disclosed systems and methods, a data bus interface (e.g., an Inter-Integrated Circuit ($I^2C$) interface) coupled between a system PSU and a system out-of-band (OOB) programmable integrated circuit (e.g., an embedded controller, baseboard management controller (BMC), etc.) may be used to communicate information between the OOB programmable integrated circuit and the PSU to synchronize PSU relay control with the current status of the modern standby (S0ix) state in order to ensure that the PSU relay remains off at all times that of modern standby (S0ix) state is in effect, e.g., in a manner that prevents frequent PSU relay clicking sounds during the modern standby (S0ix) state.

In one respect, disclosed herein is an information handling system, including: a power supply unit including a mechanical relay and a first programmable integrated circuit, the first programmable integrated circuit being programmed to control operation of the mechanical relay to selectively provide electrical power to one or more power-consuming components of the information handling system; a host programmable integrated circuit programmed to control power state transitions for the information handling system, the host programmable integrated circuit being programmed to transition the information handling system from a higher power state to a lower power state; and a second programmable integrated circuit coupled to the host programmable integrated circuit and the power supply unit. The second programmable integrated circuit may be programmed to respond to the transition of the information handling system from the higher power state to the lower power state by providing at least one first command signal to the first programmable integrated circuit to cause the first programmable integrated circuit to control the mechanical relay to turn off and remain turned off while the information handling system operates in the lower power state.

In another respect, disclosed herein is a method, including executing at least one programmable integrated circuit of an information handling system to: control operation of a mechanical relay of a power supply unit of the information handling system to selectively provide electrical power from the power supply unit to one or more power-consuming components of the information handling system; de-assert a power supply on signal provided to the power supply unit when the information handling system transitions from a higher power state to a lower power state, the power supply on signal then being allowed to toggle on and off one or more times while the information handling system operates in the lower power state; respond to the transition of the information handling system from the higher power state to the lower power state by providing at least one first command signal to the power supply unit; and respond to the receipt of the first command signal in the power supply unit by ignoring the power on supply signal supplied to the power supply unit and controlling the mechanical relay to turn off and remain turned off while the information handling system operates in the lower power state.

DESCRIPTION OF ILLUSTRATIVE EMBODIMENTS

Figure 1:
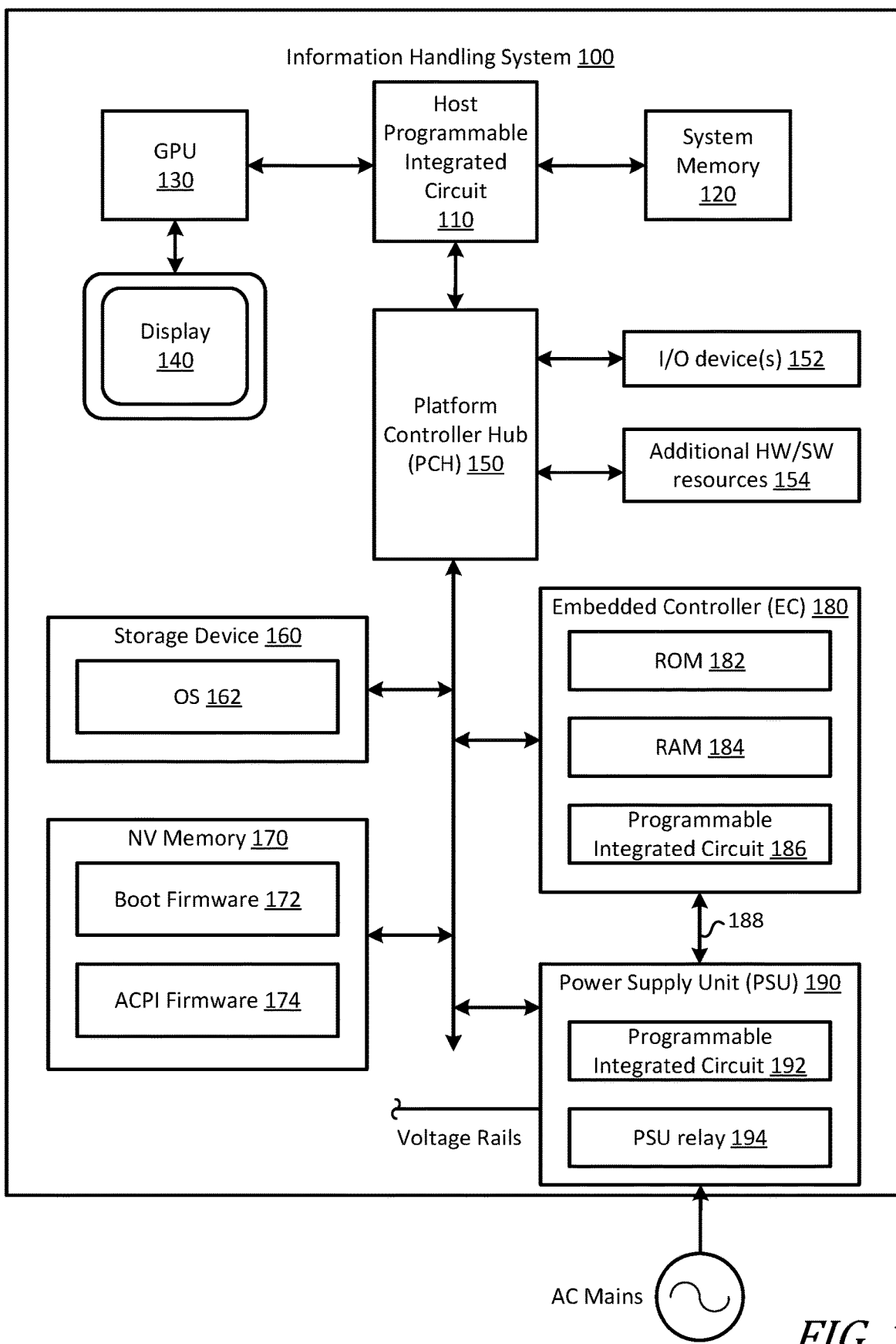
FIG. 1 illustrates a block diagram of an information handling system according to one exemplary embodiment of the disclosed systems and methods.

FIG. 1 illustrates one embodiment of an information handling system 100 (e.g., a desktop computer, laptop computer, tablet computer, a smart phone, a smart device, an Internet of Things (IoT) device, etc.) that may be implemented to provide intelligent PSU relay control to control a power supply unit (PSU) relay. It will be understood that the configuration of information handling system 100 in FIG. 1 is exemplary only, and that the disclosed systems and methods may be implemented to control operation of a PSU relay on any other type and/or configuration of information handling system. It will be further understood that while certain components of an information handling system are shown in FIG. 1, the embodiments disclosed herein are not restricted to including only those components shown and described in relation to FIG. 1.

As shown in FIG. 1, information handling system 100 includes a plurality of exemplary hardware and software components. Examples of hardware components that may be included within information handling system 100 include, but are not limited to, at least one host programmable integrated circuit 110, system memory 120, graphics processing unit (GPU) 130, display device 140, and platform controller hub (PCH) 150. Information handling system 100 may also include a variety of other hardware components, which are communicatively coupled to the PCH 150, such as but not limited to, one or more input/output (I/O) devices 152, additional hardware/software resources 154, a least one computer readable storage device 160, at least one computer readable non-volatile (NV) memory 170, an embedded controller (EC) 180 and a power supply unit (PSU) 190.

When connected to the AC mains, the PSU 190 is configured to supply electrical power to various power-consuming information handling system components via a plurality of voltage rails. It will be understood that other hardware components not explicitly shown in FIG. 1 and described herein may also be included within information handling system 100. For example, information handling system 100 may include a battery and battery management unit (BMU) for supplying electrical power to the various information handling system components when the information handling system 100 needs additional (e.g., supplemental) power or is disconnected from the AC mains.

In FIG. 1, host programmable integrated circuit 110 is configured to execute computer program instructions to perform a variety of different tasks for the information handling system. The host programmable integrated circuit 110 may be implemented using a wide variety of programmable integrated circuits (e.g., such as a controller, microcontroller, microprocessor, ASIC, etc.) and/or programmable logic devices (e.g., a field programmable gate array "FPGA", complex programmable logic device "CPLD", etc.). In one exemplary embodiment, host programmable integrated circuit 110 may include at least one central processing unit (CPU), e.g., such as an Intel central processing unit (CPU), an Advanced Micro Devices (AMD) CPU or another type of host programmable integrated circuit.

Still referring to FIG. 1, system memory 120 is coupled to host programmable integrated circuit 110 and configured to store computer program instructions, which are executable by the host programmable integrated circuit 110. System memory 120 may be implemented using any suitable memory technology, including but not limited to, random access memory (RAM), static RAM (SRAM), dynamic RAM (DRAM), synchronous dynamic RAM (SDRAM), or any other type of volatile memory.

As shown, graphics processing unit (GPU) 130 of FIG. 1 is coupled to host programmable integrated circuit 110 and configured to communicate with host programmable integrated circuit and provide corresponding visual image data to one or more display components of the information handling system 100. In the illustrated embodiment, GPU 130 is coupled to display device 140 (e.g., a LED or LCD display screen or monitor) to provide visual images to the user. In some embodiments, GPU 130 may be further coupled to one or more display ports to support additional display functions. Although shown in FIG. 1 as a separate discrete component coupled to host programmable integrated circuit 110 via a data bus, in other embodiments host programmable integrated circuit 110 may include integrated graphics processing capability and may be coupled to provide visual image data directly to display device 140.

In FIG. 1, platform controller hub (PCH) 150 is coupled to host programmable integrated circuit 110 and is configured to control certain data paths and manage information flow between components of the information handling system 100. PCH 150 may include a variety of communication interfaces and ports for communicating with various information handling system components, such as I/O devices 152, additional hardware/software resources 154, computer readable storage device 160, NV memory 170, EC 180 and PSU 190. Examples of communication interfaces and ports that may be included within PCH 150 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

Still referring to FIG. 1, I/O device(s) 152 enable the user to interact with information handling system 100 and the software/firmware executing thereon. Examples of I/O devices 152 include, but are not limited to, keyboards, keypads, touch screens, cameras, mice, scanning devices, voice or optical recognition devices, biometric devices, and any other devices suitable for entering or retrieving data or receiving user input. Additional hardware/software resources 154 may be coupled to one or more of the communication interfaces and ports contained within PCH 150 to provide additional functionality to the information handling system 100. Examples of additional hardware/software resources 154 include, but are not limited to, a video card, sound card, small system computer interface (SCSI) controller, hardware redundant array of independent disks (RAID) controller, serial/parallel port card, IEEE 1394 cards, Thunderbolt™ card, a USB hub with USB controller hardware or software driver, audio I/O devices, a SATA/eSATA controller card, PS/2 controller card, non-volatile memory card, PCH storage, CPU storage, etc.

In FIG. 1, computer readable storage device 160 may include any type of persistent, non-transitory computer readable storage device, such as one or more hard disk drives (HDDs) or solid-state drives (SSDs), and may be configured to store software components and/or data. For example, computer readable storage device 160 may store an operating system (OS) 162 for the information handling system 100, in addition to other software components and/or data (not shown). The software components stored within the computer readable storage device 160 may be executed by host programmable integrated circuit 110 to perform various operations for the system and/or the user.

Computer readable non-volatile (NV) memory 170 of FIG. 1 may include any suitable type of non-volatile memory and/or Flash memory device, and may be configured, for example, to store boot firmware (FW) 172, Advanced Configuration and Power Interface (ACPI) firmware 174 and other system firmware (not shown). Boot firmware 172 may include software and/or firmware modules for specifying hardware configuration settings, system date/time, boot sequence, etc., and may be implemented as a Basic Input/Output System (BIOS) and/or a Unified Extensible Firmware Interface (UEFI).

The Advanced Configuration and Power Interface (ACPI) is an open standard that operating systems can use to discover and configure computer hardware components and to perform power management, thermal management and status monitoring. In the embodiment of FIG. 1, the ACPI firmware 174 stored within computer readable NV memory 170 serves as an interface layer between boot firmware 172 and OS 162 and brings power management under the control of the operating system power management system (OSPM). Under the OSPM, the OS 162 directs all system, programmable integrated circuit (e.g., processor) and device power state transitions. For example, the OS 162 may use information from applications and user settings to transition the information handling system 100 between a plurality of system power states, which are defined by the ACPI specification.

As noted above, the ACPI specification defines four global "Gx" power states and six sleep "Sx" power states for an ACPI-compliant system. The global power states include: the working (G0) state (also referred to as the S0 state), the sleeping (G1) state, the soft off (G2) state (also referred to as the S5 state) and the mechanical off (G3) state. During the working (G0/S0) state, PSU 190 supplies power to various system components and the host programmable integrated circuit 110 is executing instructions. Power is removed from the system (e.g., via a mechanical relay on the PSU) during the mechanical off (G3) state. The soft off (G2) state is similar to the mechanical off (G3) state with the exception that the PSU 190 supplies power to the power button (and possibly other components) to allow the system to return to the working (S0) state. When configured in the G3 and G2 states, the system must be restarted to return to the working (S0) state.

The global sleeping (G1) state includes a plurality of lower power states that can be used to reduce power consumption within the system, while enabling the system to quickly transition from a lower power state to the active working (S0) state. The G1 sleeping states traditionally include: the S1 sleeping state (in which power is maintained to the CPU and RAM), the S2 sleeping state (in which the CPU is powered off), the S3 sleeping state (traditionally referred to as standby or sleep) and the S4 sleeping state (i.e., hibernation). As noted above, some information handling systems provide support for a seventh low power state, referred to as the modern standby (S0ix) state or low power S0 idle state. The system power can be toggled on/off when operating in modern standby. This allows background activity to continue while the system appears to be "off" and provides a simplified wake process and a faster transition from a lower power state to the active working state.

In FIG. 1, embedded controller (EC) 180 includes read only memory (ROM) 182, random access memory (RAM) 184 and a EC programmable integrated circuit 186 (e.g., a controller, microcontroller, microprocessor, ASIC, etc.) for executing program instructions, which may be stored within its internal memory (RAM, ROM) and/or fetched from NV memory 170. EC 180 may be generally configured to boot the information handling system and perform other functions as described herein. For example, the EC programmable integrated circuit 186 within EC 180 may be configured to execute program instructions (e.g., a boot block) stored within its internal ROM 182 to initiate a boot process for the information handling system 100. Each time the information handling system 100 is powered on or rebooted, a programmable integrated circuit of system 100 (e.g., EC programmable integrated circuit 186 and/or host programmable integrated circuit 110) may execute boot firmware 172 to test and initialize information handling system hardware components, perform a Power-On Self-Test (POST) to ensure the hardware configuration is valid and working properly, load the OS 162 from the computer readable storage device 160, and/or perform a variety of other actions known in the art.

In some embodiments of the disclosed systems and methods, EC programmable integrated circuit 186 may be further configured to execute program instructions to control operation of the PSU 190 when the information handling system 100 is operating in a low power state (such as, e.g., the modern standby state). In one embodiment, EC programmable integrated circuit 186 may execute program instructions stored within RAM 184 to control operation of a mechanical relay circuit 194 included within PSU 190 upon entering, operating within and exiting the low power state.

In the embodiment of FIG. 1, PSU 190 converts the alternating current (AC) received from the AC mains to low voltage direct current (DC), which is used to operate various power-consuming hardware components of the information handling system 100 (such as, e.g., the system motherboard, programmable integrated circuits, memory, storage devices, video cards, network cards, peripherals and/or other external devices, etc.). As shown in FIG. 1, PSU 190 provides DC current and power to the various power-consuming hardware components via a plurality of voltage rails. For example, power supply units that comply with the ATX standard may provide three positive voltage rails (+3.3 VDC, +5 VDC and +12 VDC) and one negative voltage rail (−12 VDC). In addition, a +5V standby (SB) voltage rail may be provided to support standby functions and power certain peripherals when the information handling system 100 is in a low power state (e.g., standby, sleep and hibernation states). As shown in FIG. 1, PSU 190 includes a programmable integrated circuit (IC) 192, and a mechanical relay (referred to herein as PSU relay 194) that itself is electrically coupled to control (i.e., allow or disallow) flow of DC current and power to voltage rails from the PSU 190. The PSU programmable integrated circuit 192 is coupled to receive an active low power supply on (PS_ON #) signal from the system motherboard or SoC (via the PCH 150) and is configured to control operation of the PSU relay 194.

In conventional information handling systems, the PSU is directly controlled by the PS_ON #signal supplied from the system motherboard (or SoC). When the PS_ON #signal is asserted (i.e., pulled low), the PSU relay is turned on to provide DC current to the information handling system components via the plurality of voltage rails. When the PS_ON #signal is de-asserted (i.e., pulled high), the PSU relay is turned off and the voltage rails are held at zero potential to prevent DC current from being supplied to the information handling system components. The PS_ON #signal has no effect on the +5VSB standby voltage rail, which is always enabled whenever AC power is present.

The PSU relay 194 closes or turns on during high or full power operation to reduce $I^2R$ power loss, and opens or turns off during low power operation to reduce relay coil power loss and provide for inrush current protection. The PSU relay 194, being a mechanical device, produces an audible noise (e.g., an audible "click") that can be heard by the end user each time the PSU relay 194 opens when the system transition from the active working (S0) state to a lower power state, and closes when the system transitions from a lower power state to the active working (S0) state.

Figure 2:
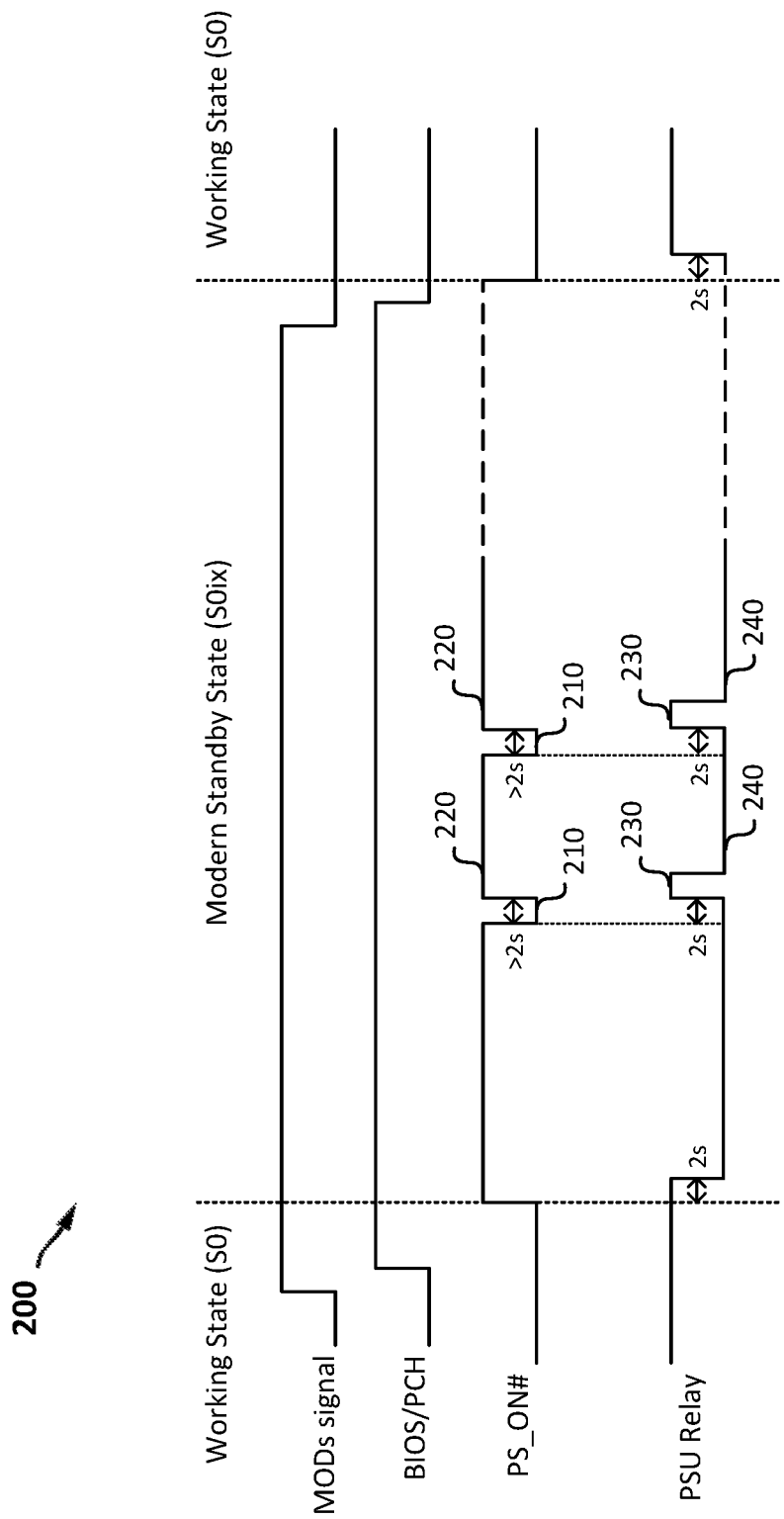
FIG. 2 is a conventional timing diagram.

As noted above, conventional information handling systems that support modern standby allow the PS_ON #signal to toggle on/off repeatedly when the conventional system is operating in the modern standby (S0ix) state. In these conventional systems, the PSU relay opens/closes in response to the PS_ON #signal supplied to the PSU. Each time the PS_ON #signal toggles on/off during the modern standby (S0ix) state, the PSU relay closes/opens to turn the PSU on/off and produces an audible "click," which can be heard by the end user. FIG. 2 provides a timing diagram 200 that illustrates such conventional behavior in which the PSU relay toggling occurs when a PSU relay is controlled by a power supply on (PS_ON #) signal while a conventional information handling system is operating in a modern standby (S0ix) state As shown in conventional timing diagram 200, a conventional information handling system transitions from the working (S0) state to the modern standby (S0ix) state by supplying an asserted (i.e., high) modern standby (MODs) signal from the OS to the BIOS/PCH. In response to receiving the asserted MODs signal, the BIOS/PCH supplies a de-asserted (i.e., high) PS_ON #signal to the PSU. After a short time delay (e.g., 2 seconds), the PSU relay is opened to turn off the PSU.

As further shown in conventional timing diagram 200, the PS_ON #signal supplied from the BIOS/PCH to the PSU may toggle on (at 210) and off (at 220) repeatedly during the modern standby (S0ix) state until the MODs signal is de-asserted (i.e., pulled low) and the PS_ON #signal is asserted (i.e., pulled low). Each time the PS_ON #signal is toggled on at 210, the PSU relay is closed at 230 to turn on the PSU for a first period of time (e.g., about 1 second). Each time the PS_ON #signal is toggled off at 220, the PSU relay is opened at 240 to turn off the PSU for a second period of time (e.g., about 180 seconds). The repetitive toggling on/off of the PSU relay during modern standby operation is undesirable, since it increases power consumption and produces an audible click that may cause the end user to question the integrity of the PSU and/or the system.

Figure 6:
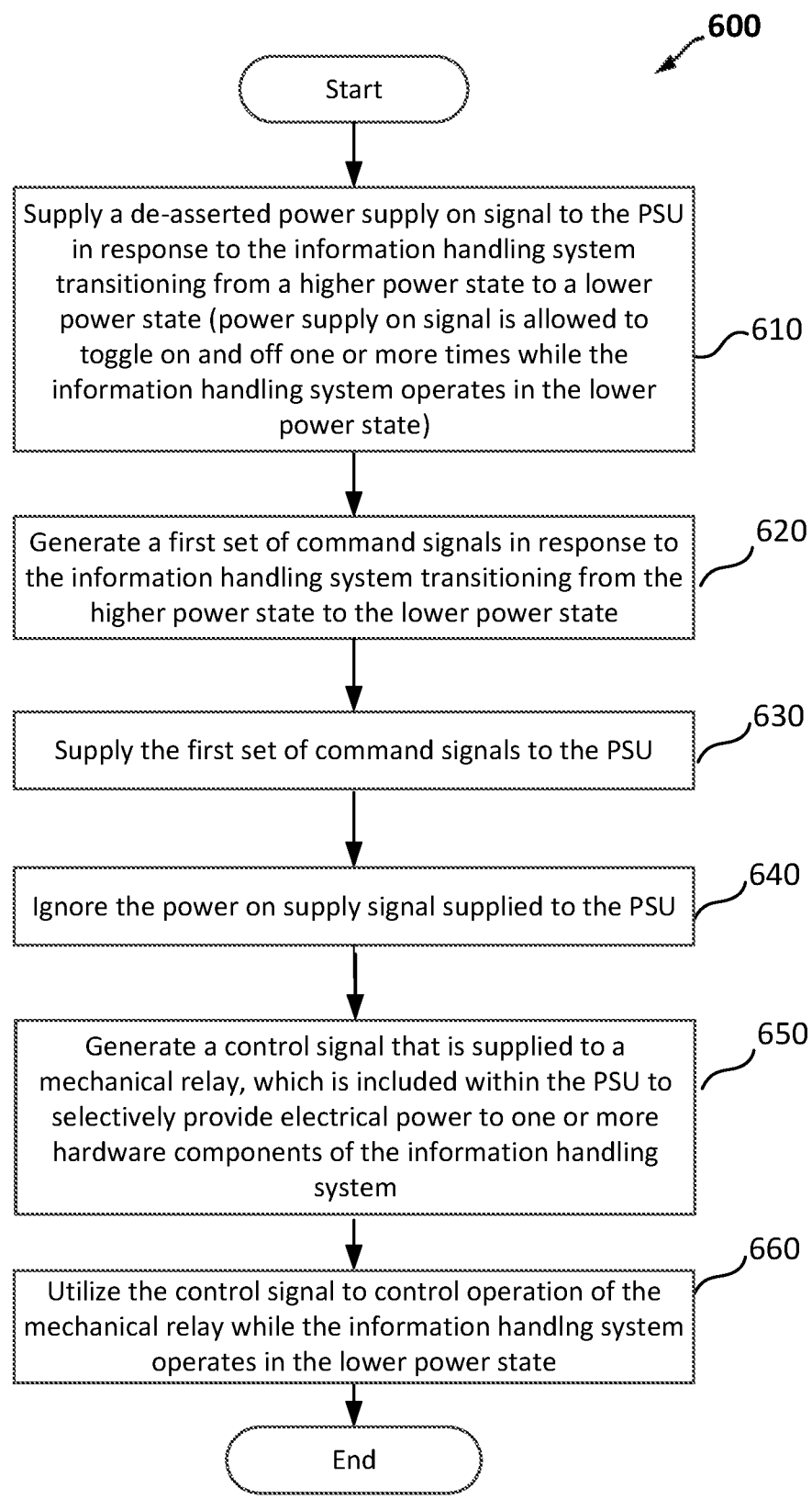
FIG. 6 illustrates methodology according to one exemplary embodiment of the disclosed systems and methods.
Figure 7:
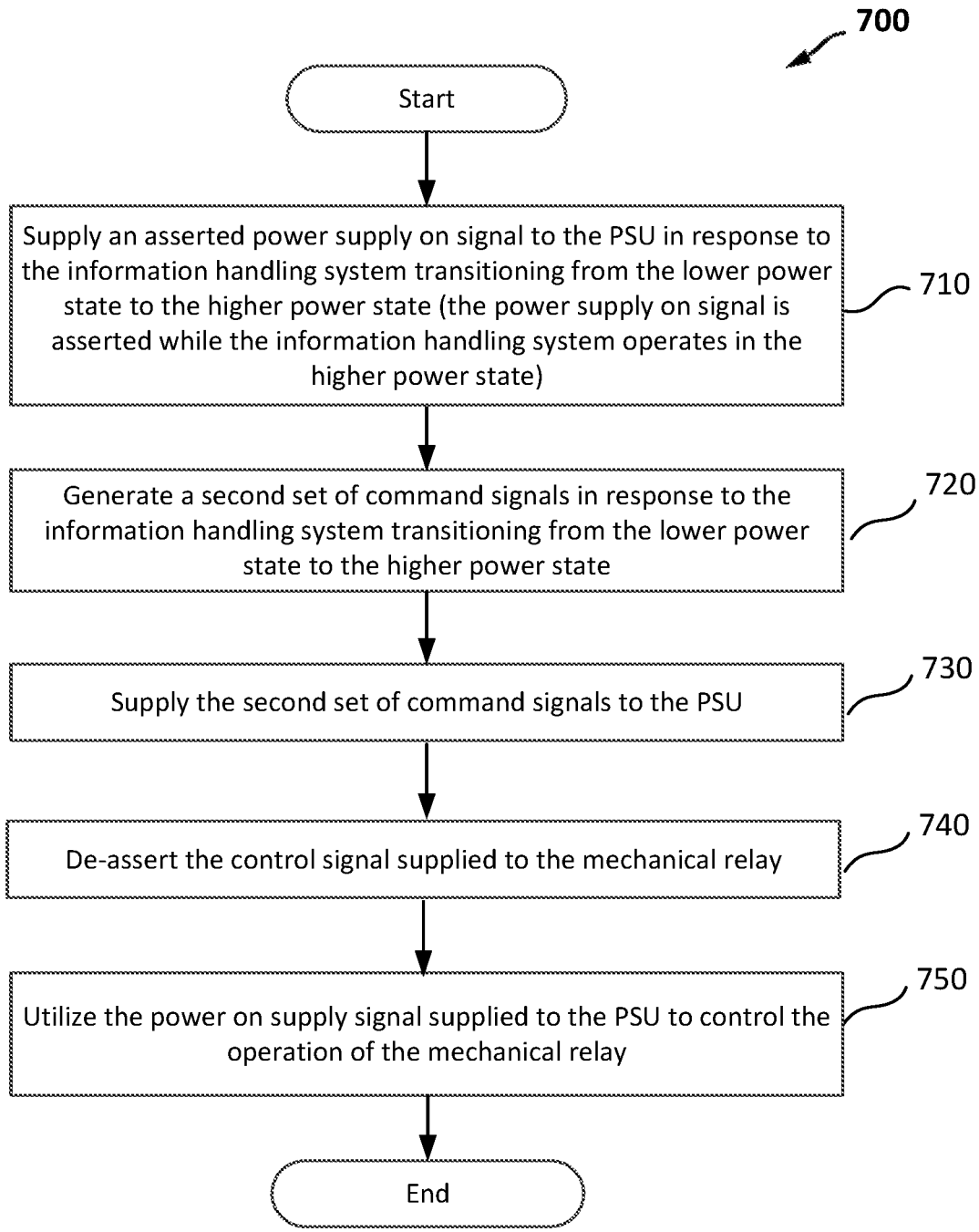
FIG. 7 illustrates methodology according to one exemplary embodiment of the disclosed systems and methods.

To avoid the disadvantages mentioned above, the present disclosure provides various embodiments of improved information handling systems and methods to control operation of a power supply unit during a low power state. More specifically, the present disclosure provides improved information handling systems (e.g., such as information handling system 100) and related methods (e.g., such as shown in FIGS. 6 and 7) that can be used to control operation of the PSU relay 194 included within PSU 190 when the information handling system is entering, operating within, and exiting the modern standby (S0ix) state.

The systems and methods disclosed herein utilize an intelligent PSU relay control mechanism to control operation of the PSU relay 194 when the information handling system is operating in the modern standby (S0ix) state. In some embodiments, the intelligent PSU relay control mechanism may prevent the behavior shown in FIG. 2 from occurring by preventing the PSU relay 194 from toggling on/off during the modern standby (S0ix) state. In doing so, the intelligent PSU relay control mechanism may reduce power consumption, improve PSU reliability (by maintaining a PSU steady state during modern standby) and eliminate the audible noise (e.g., clicking) that would otherwise be produced by such toggling.

Figure 3:
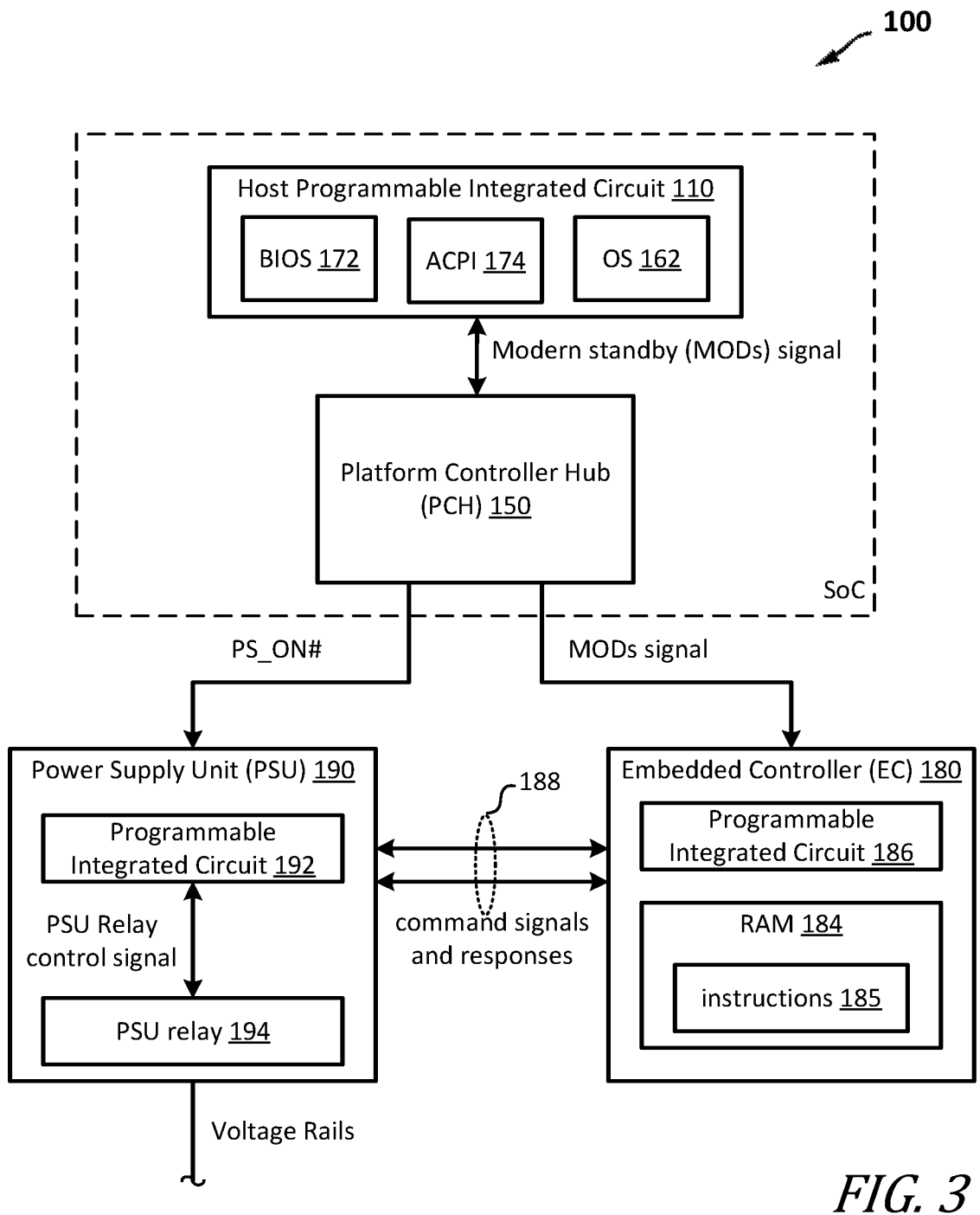
FIG. 3 illustrates a functional block diagram of an information handling system according to one exemplary embodiment of the disclosed systems and methods.

The information handling system 100 shown in FIGS. 1 and 3 represents one embodiment of an improved information handling system that utilizes the techniques described herein to control operation of the PSU 190 during a low power state, and more specifically, to control operation of the PSU relay 194 when the information handling system 100 is entering, operating within, and exiting the modern standby (S0ix) state.

The techniques described herein may generally be implemented as computer program instructions, which are locally stored and executed within an information handling system, such as but not limited to, the information handling system 100 shown in FIGS. 1 and 3 (described below). For example, the techniques described herein may be implemented as computer program instructions, which are stored within at least one non-transitory memory (such as, e.g., system memory 120, storage device 160, NV memory 170 and/or EC RAM 184) and executed by at least one programmable integrated circuit (e.g., host programmable integrated circuit 110, EC programmable integrated circuit 186 and/or PSU programmable integrated circuit 192). It will be understood that, while FIGS. 1 and 3 provide one example of information handling system components that can be used to implement the techniques described herein, the disclosed techniques are not strictly limited to only those components shown in the figures. In some embodiments, other programmable integrated circuits not shown in FIGS. 1 and 3 may be utilized to implement the techniques disclosed herein. For example, another programmable integrated circuit or out-of-band (OOB) programmable integrated circuit (e.g., a baseboard management controller (BMC)) may be utilized in place of the EC 180 that is shown in FIGS. 1 and 3.

Figure 4:
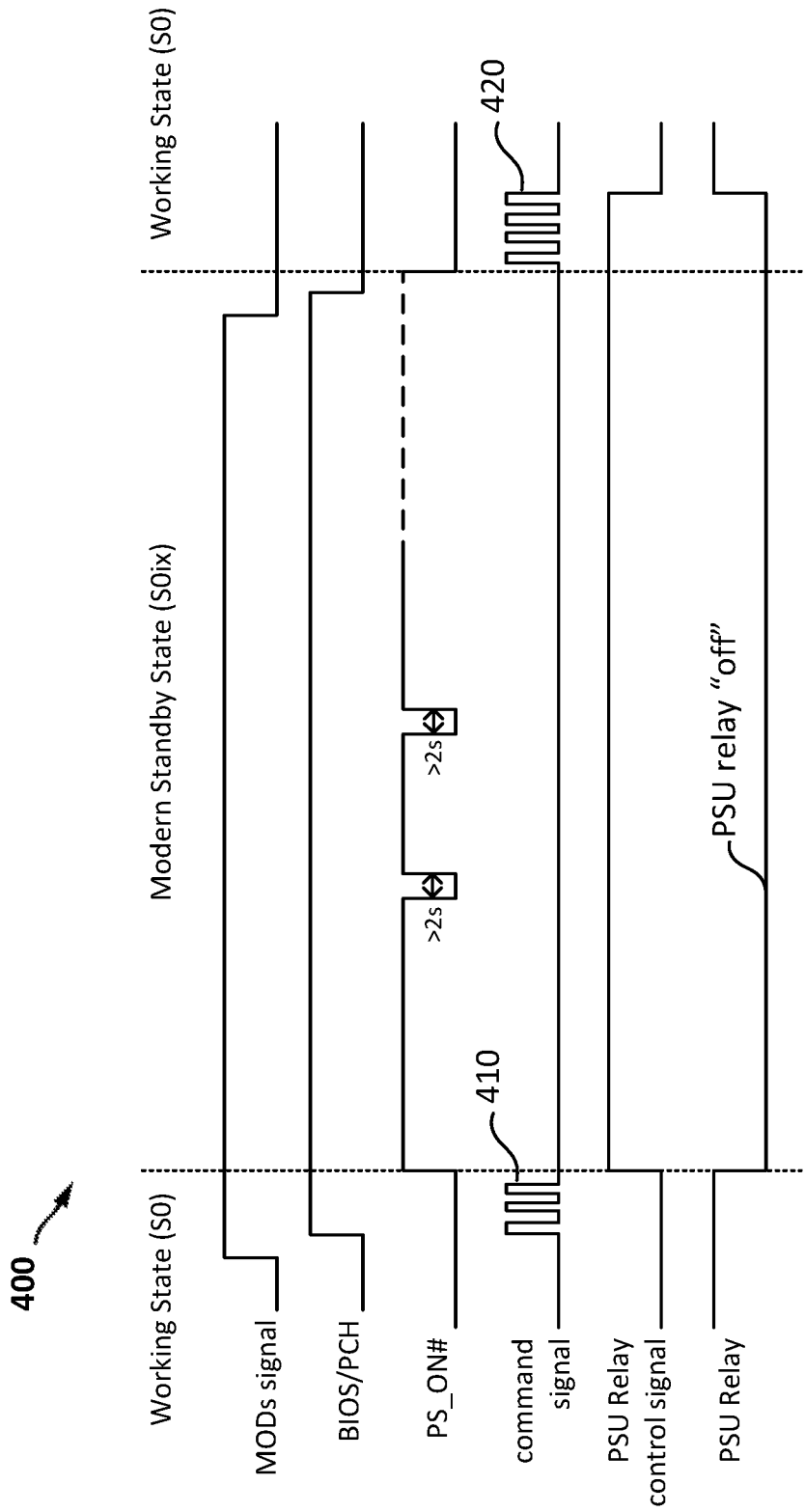
FIG. 4 is a timing diagram according to one exemplary embodiment of the disclosed systems and methods.

FIG. 3 is a functional block diagram of various information handling system components that may be used in one embodiment to implement the intelligent PSU relay control mechanism of the disclosed systems and methods. FIG. 4 is a timing diagram 400 illustrating signals that may be utilized in one embodiment by the intelligent PSU relay control mechanism to control operation of the PSU relay 194 when the information handling system is entering, operating within, and exiting a low power state. For example, the intelligent PSU relay control mechanism disclosed herein may utilize the signals shown in FIG. 4 to control operation of the PSU relay 194 upon entering, operating within, and exiting the modern standby (S0ix) state.

As noted above and shown in FIGS. 1 and 3, information handling system 100 includes a host programmable integrated circuit 110, a platform controller hub (PCH) 150, an embedded controller (EC) 180 and a power supply unit (PSU) 190, among other hardware and software components. The PSU 190 includes a PSU relay 194 and a PSU programmable integrated circuit 192, which is programmed to control operation of the PSU relay 194 to selectively provide electrical current and power to one or more power-consuming hardware components of the information handling system 100.

Host programmable integrated circuit 110 executes program instructions to control power state transitions for the information handling system 100, including system power state transitions from a higher power state to a lower power state (and vice versa). For example, the host programmable integrated circuit 110 may execute a first set of program instructions (contained, e.g., within OS 162, BIOS 172 and/or ACPI 174) to generate a modern standby (MODs) signal, which may be used to transition the information handling system 100 from a working (S0) state to a modern standby (S0ix) state (and vice versa). In some embodiments, the modern standby (MODs) signal may be asserted (e.g., high) to enter the modern standby (S0ix) state and de-asserted (e.g., low) to exit the modern standby (S0ix) state, as shown in FIG. 4 and discussed in more detail below.

In FIG. 3, PCH 150 is coupled as shown to receive the modern standby (MODs) signal generated by the host programmable integrated circuit 110 and configured to provide various signals to the EC 180 and the PSU 190 in response thereto. In response to receiving the modern standby (MODs) signal, for example, the PCH 150 may forward the modern standby (MODs) signal to the EC 180 and supply a power supply on (PS_ON #) signal to the PSU 190, as shown in FIGS. 3 and 4.

Figure 5A:
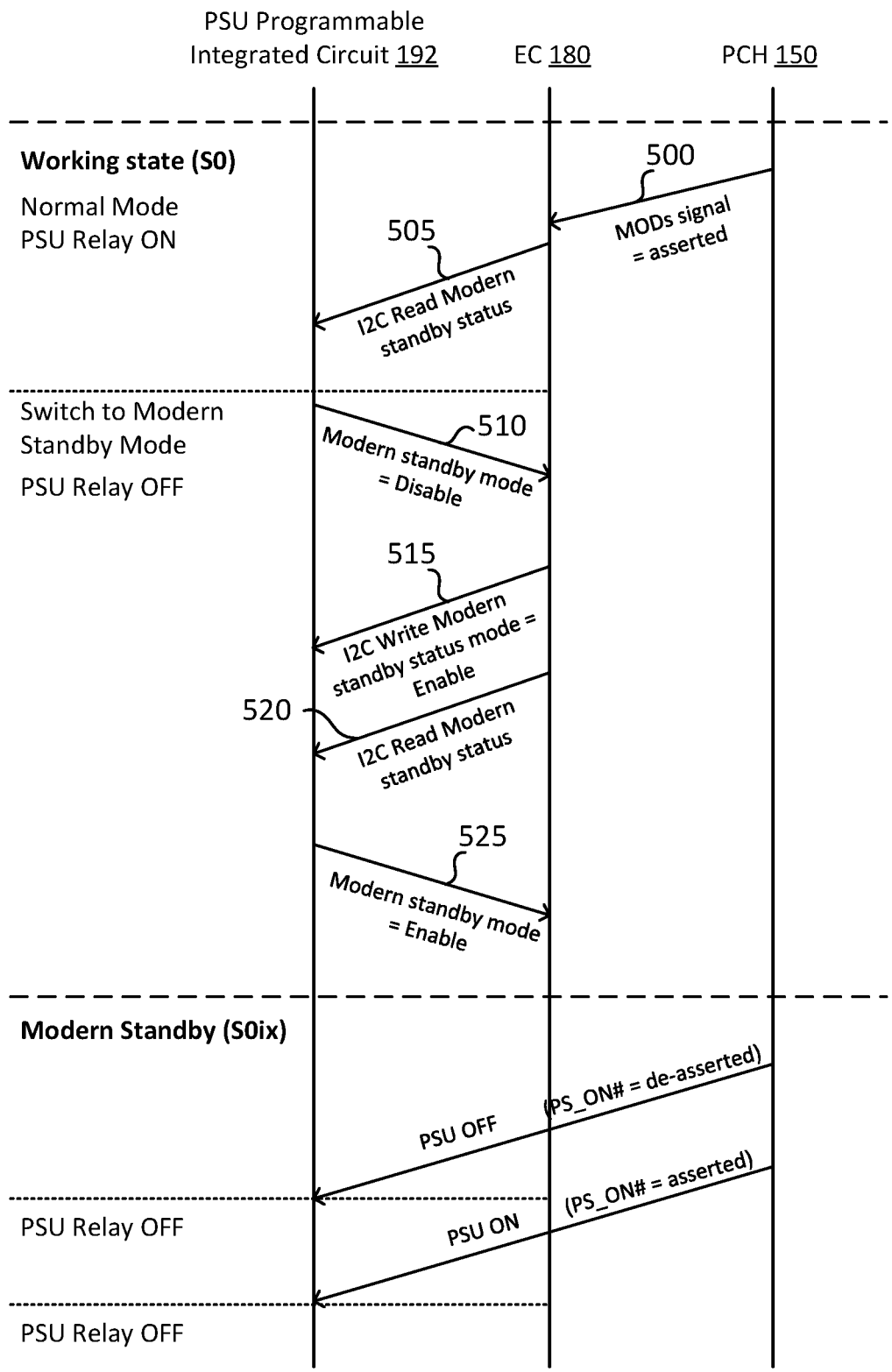
FIG. 5A illustrates a flow diagram according to one exemplary embodiment of the disclosed systems and methods.
Figure 5B:
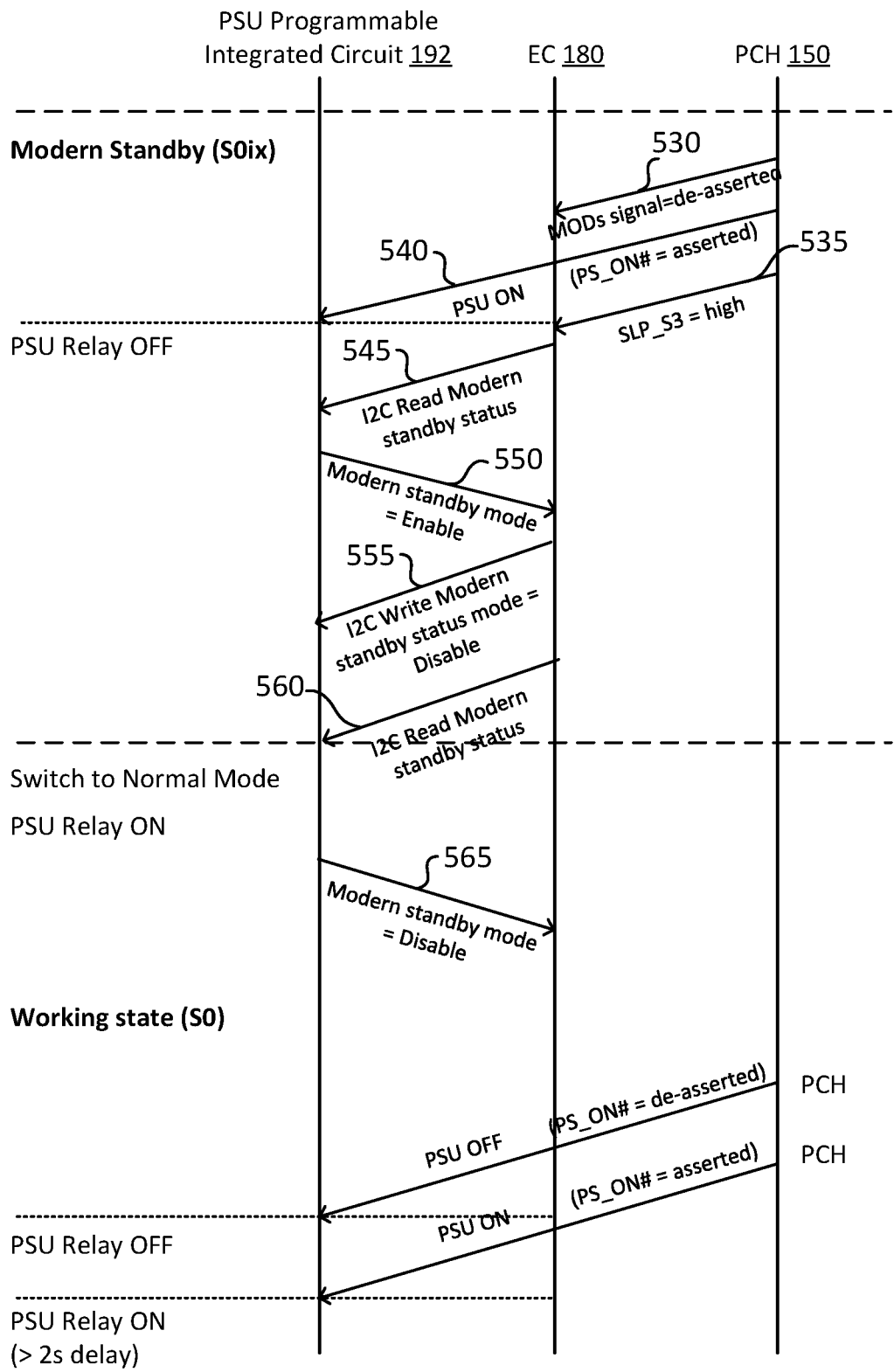
FIG. 5B illustrates a flow diagram according to one exemplary embodiment of the disclosed systems and methods.

As shown in FIG. 3, EC 180 is coupled to PCH 150 and PSU 190. In some embodiments, EC 180 may be coupled to the PCH 150 via a system bus, and may be coupled to the PSU 190 via an I²C bus 188 containing I²C clock and data lines. As shown in FIG. 3, EC 180 includes non-transitory memory (e.g., non-volatile RAM 184) and a EC programmable integrated circuit 186 for executing a second set of program instructions 185 stored within the non-transitory memory. In response to receiving the modern standby (MODs) signal from the PCH 150, the EC programmable integrated circuit 186 within EC 180 may execute the second set of program instructions 185 to generate command signals, which are supplied, via the I²C bus 188, to the PSU programmable integrated circuit 192 included within PSU 190. In some embodiments, a first set of command signals may be generated upon entering the modern standby (S0ix) state and a second set of command signals may be generated upon exiting the modern standby (S0ix) state, as shown in FIGS. 4, 5A and 5B.

In one embodiment of the disclosed systems and methods, PSU 190 receives the power supply on (PS_ON #) signal from PCH 150 and the command signals from EC 180. When entering the modern standby (S0ix) state, EC 180 supplies a first set of command signals to the PSU 190 that cause the PSU programmable integrated circuit 192 to: (a) ignore the power supply on (PS_ON #) signal supplied to the PSU 190 by the PCH 150, and (b) generate a control signal (e.g., a PSU relay control signal) that is supplied to the PSU relay 194 to control operation of the PSU relay 194 while the information handling system operates in the modern standby (S0ix) state. When exiting the modern standby (S0ix) state, EC 180 supplies a second set of command signals to the PSU 190 that cause the PSU programmable integrated circuit 192 to utilize the power supply on (PS_ON #) signal supplied to the PSU 190 by the PCH 150 to control operation of the PSU relay 194. FIG. 4 is one exemplary embodiment of a timing diagram 400 that illustrates such behavior.

As shown in the exemplary timing diagram 400 of FIG. 4, information handling system 100 transitions from the working (S0) state to the modern standby (S0ix) state by supplying an asserted (e.g., high) modern standby (MODs) signal from the OS 162 to the PCH 150. PCH 150 forwards the asserted MODs signal to the EC 180 and supplies a de-asserted (e.g., high) PS_ON #signal to the PSU 190. As noted above and shown in FIG. 4, however, the PS_ON #signal may toggle on/off one or more times while the information handling system 100 operates in the modern standby (S0ix) state.

Upon receiving the asserted MODs signal, EC 180 generates a first set of command signals 410 that is supplied, via the I²C bus 188, to the PSU 190. In response to receiving the first set of command signals 410, the PSU programmable integrated circuit 192 included within PSU 190 generates and supplies an asserted (e.g., high) PSU relay control signal to the PSU relay 194. The asserted PSU relay control signal opens (i.e., turns off) the PSU relay 194 to disallow flow of current and power to voltage rails, and prevents the PSU relay 194 from toggling, while the information handling system 100 operates in the modern standby (S0ix) power state. This enables PSU 190 to maintain a steady state during an entirety of the modern standby (S0ix) power state.

As further shown in the exemplary timing diagram 400 of FIG. 4, information handling system 100 transitions (exits) from the modern standby (S0ix) state to the working (S0) state by supplying a de-asserted (e.g., low) modern standby (MODs) signal from the OS 162 to the PCH 150. PCH 150 forwards the de-asserted MODs signal to the EC 180 and supplies an asserted (e.g., low) PS_ON #signal to the PSU 190. Upon receiving the de-asserted MODs signal, EC 180 generates a second set of command signals 420 that is supplied, via the I²C bus 188, to the PSU 190. In response to receiving the second set of command signals 420, the PSU programmable integrated circuit 192 included within PSU 190 de-asserts (e.g., pulls low) the PSU relay control signal to return to normal relay operation. After exiting the modern standby (S0ix) power state, the power supply on (PS_ON #) signal supplied to the PSU 190 from the PCH 150 is utilized to control the on and off operation of the PSU relay 194, i.e., the PS_ON #signal is asserted (e.g., pulled low) to turn on the PSU relay to provide DC current and power via voltage rails to various power-consuming information handling system components, and the PS_ON #signal is de-asserted (e.g., pulled high) to turn off the PSU relay to discontinue DC current and power flow via voltage rails to these various power-consuming information handling system components.

FIG. 5A illustrates one exemplary embodiment of various signals, commands and responses communicated between PCH 150, EC 180 and PSU programmable integrated circuit 192 that may be employed when switching from the working (S0) state to the modern standby (S0ix) state. As shown in FIG. 5A, PCH 150 supplies an asserted MODs signal 500 to EC 180 to transition the information handling system 100 from the working (S0) state to the modern standby (S0ix) state. Upon receiving the asserted MODs signal 500, EC 180 may respond by supplying a first set of command signals 410 to the PSU 190 to enable a modern standby mode, as shown in FIG. 4. In this regard, FIG. 5A illustrates example commands and responses that may be communicated between the EC 180 and PSU 190 to enable the modern standby mode.

As shown in FIG. 5A, in response to receiving the asserted MODs signal 500, EC 180 may send a first command 505 to the PSU programmable integrated circuit 192, over the I²C bus 188, to read the modern standby status. PSU programmable integrated circuit 192 may return a first response 510 to the EC 180 indicating that the modern standby mode is disabled. Thereafter, EC 180 may send a second command 515 and a third command 520 to the PSU programmable integrated circuit 192 over the I²C bus 188. The second command 515 instructs the PSU programmable integrated circuit 192 to write the modern standby status as enabled, while the third command 520 instructs the PSU programmable integrated circuit 192 to read the modern standby status. In response, the PSU programmable integrated circuit 192 may return a second response 525 to the EC 180 indicating that the modern standby mode is now enabled.

Once modern standby mode is so enabled in response to the first set of command signals 410 from EC 180, PSU programmable integrated circuit 192 responds by generating the PSU relay control signal (shown in FIG. 4), which is supplied to the PSU relay 194 and used to turn the PSU relay 194 off while the information handling system 100 operates in the modern standby (S0ix) state. As shown in FIGS. 4 and 5A, the PSU relay 194 remains off while the information handling system 100 operates in the modern standby (S0ix) state, regardless of the state of the PS_ON #signal supplied to the PSU 190 directly from the PCH 150.

FIG. 5B illustrates various signals, commands and responses communicated between PCH 150, EC 180 and PSU programmable integrated circuit 192 when switching from the modern standby (S0ix) state to the working (S0) state. As shown in FIG. 5B, PCH 150 supplies a de-asserted MODs signal 530 to EC 180 to transition the information handling system 100 from the modern standby (S0ix) state to the working (S0) state. The PCH 150 may also supply a logic high S3 sleep state (SLP_S3) signal 535 to the EC 180 and an asserted power supply on (PS_ON #) signal 540 to the PSU programmable integrated circuit 192. Upon receiving the de-asserted MODs signal 530, EC 180 supplies a second set of command signals 420 to the PSU 190 to disable the modern standby mode, as shown in FIG. 4. In this regard, FIG. 5B illustrates example commands and responses that may be communicated between the EC 180 and PSU 190 to disable the modern standby mode.

As shown in FIG. 5B, EC 180 may send a fourth command 545 to the PSU programmable integrated circuit 192, over the I²C bus 188, to read the modern standby status. In response, PSU programmable integrated circuit 192 returns a third response 550 to the EC 180 indicating that the modern standby mode is enabled. Thereafter, EC 180 may send a fifth command 555 and a sixth command 560 to the PSU programmable integrated circuit 192 over the I²C bus 188. The fifth command 555 instructs the PSU programmable integrated circuit 192 to write the modern standby status as disabled, while the sixth command 560 instructs the PSU programmable integrated circuit 192 to read the modern standby status. In response, PSU programmable integrated circuit 192 may return a fourth response 565 to the EC 180 indicating that the modern standby mode is now disabled.

Once modern standby mode is disabled, PSU programmable integrated circuit 192 de-asserts the PSU relay control signal (shown in FIG. 4), which was used to control the PSU relay 194 during modern standby mode. De-assertion of the PSU relay control signal returns the PSU relay 194 to normal relay operation and enables the PS_ON #signal to control the on and off state of the PSU relay 194. When the information handling system 100 is operating in the working (S0) state, the PSU relay 194 is opened (i.e., turned off) when a de-asserted PS_ON #signal is supplied directly from PCH 150 to the PSU 190, and closed (i.e., turned on) when an asserted PS_ON #signal is supplied directly from PCH 150 to the PSU 190, as shown in FIG. 5B.

FIGS. 6 and 7 illustrate various embodiments of methods that utilize the techniques described herein to control operation of a power supply unit (PSU) 190 included within an information handling system 100. Methodology 600 shown in FIG. 6 utilizes the techniques of the disclosed systems and methods to control operation of the mechanical relay 194 included within the PSU 190 when the information handling system 100 transitions from a higher power state to a lower power state, and while the information handling system 100 operates within the lower power state. Methodology 700 shown in FIG. 7 utilizes the techniques of the disclosed systems and methods to control operation of the mechanical relay 194 when the information handling system 100 transitions from a lower power state to a higher power state, and while the information handling system 100 operates within the higher power state. Although not strictly limited to such, the lower power state may be a modern standby (S0ix) power state and the higher power state may be an active working (S0) state.

Methodology 600 of FIG. 6 and methodology 700 of FIG. 7 are computer implemented methods that are performed by at least one programmable integrated circuit of an information handling system executing program instructions stored within at least one non-transitory memory of the information handling system. For example, certain blocks of methodology 600 shown in FIG. 6 may be performed by one or more of the host programmable integrated circuit 110, the EC programmable integrated circuit 186 within EC 180 and/or the PSU programmable integrated circuit 192 within PSU 190 upon executing program instructions stored within one or more of the system memory 120, storage device 160, NV memory 170 and/or EC RAM 184. However, methodologies 600 and 700 are not restricted to the hardware components listed above, and may be alternatively performed by other programmable integrated circuits and non-transitory memory included within an information handling system.

Methodology 600 shown in FIG. 6 may be utilized when transitioning the information handling system from a higher power state (such as the working state) to a lower power state (such as the modern standby state). In some embodiments, methodology 600 may begin (in block 610) by supplying a de-asserted power supply on signal to the PSU in response to the information handling system transitioning from the higher power state to the lower power state. The power supply on signal supplied to the PSU (in block 610) is de-asserted, but allowed to toggle on and off one or more times, while the information handling system operates in the lower power state.

Next, block 620 of methodology 600 may include generating a first set of command signals in response to the information handling system transitioning from the higher power state to the lower power state, and block 630 may include supplying the first set of command signals to the PSU. In response to receiving the first set of command signals from block 630, methodology 600 may further include: (a) ignoring the power on supply signal supplied to the PSU (in block 640), (b) generating a control signal that is supplied to a mechanical relay, which is included within the PSU to selectively provide electrical power to one or more power-consuming hardware components of the information handling system (in block 650), and utilizing the generated control signal to control operation of the mechanical relay while the information handling system operates in the lower power state (in block 660). As noted above, the generated control signal (e.g., the PSU relay control signal shown in FIG. 4) turns the mechanical relay off, and ensures that the mechanical relay remains off and the PSU maintains a steady state, while the information handling system operates in the lower power state.

Methodology 700 shown in FIG. 7 may be utilized when transitioning the information handling system from a lower power state (such as the modern standby state) to a higher power state (such as the working state). In some embodiments, methodology 700 may begin (in block 710) by supplying an asserted power supply on signal to the PSU in response to the information handling system transitioning from the lower power state to the higher power state. The power supply on signal supplied to the PSU (in block 710) is asserted while the information handling system operates in the higher power state.

Next, methodology 700 may include generating a second set of command signals in response to the information handling system transitioning from the lower power state to the higher power state (in block 720) and supplying the second set of command signals to the PSU (in block 730). In response to receiving the second set of command signals, methodology 700 may further include: (a) de-asserting the control signal supplied to the mechanical relay (in block 740), and (b) utilizing the power on supply signal supplied to the PSU to control the operation of the mechanical relay (in block 750).

The information handling system 100 shown in FIGS. 1 and 3, the diagrams shown in FIGS. 4, 5A and 5B, and methodologies 600 and 700 of FIGS. 6 and 7 improve upon conventional information handling systems and methods by providing an intelligent PSU relay control mechanism than may be utilized to control operation of the PSU relay 194 when the information handling system 100 is entering, operating within and exiting the modern standby (S0ix) state. The intelligent PSU relay control mechanism described herein may include at least two operating modes: a modern standby mode and a normal mode.

When configured in the modern standby mode, the intelligent PSU relay control mechanism supplies a control signal to the PSU relay 194 to turn off the PSU relay 194, and to ensure that the PSU relay 194 remains off, while the information handling system 100 operates in the modern standby (S0ix) state. This prevents the PSU relay 194 from exhibiting the conventional FIG. 2 behavior of toggling on/off during modern standby, and as a consequence, reduces power consumption, improves PSU reliability (by maintaining a PSU steady state during modern standby) and eliminates the audible noise (e.g., clicking) that would otherwise be produced by such toggling. When the information handling system 100 exits the modern standby (S0ix) state and enters the active working (S0) state, the intelligent PSU relay control mechanism returns to the normal mode of operation and uses the PS_ON #signal to control operation of the PSU relay 194.

It will understood that the particular combination of blocks of FIGS. 6 and 7 are exemplary only, and that other combinations of additional, fewer, combined, and/or alternative blocks may be employed to provide intelligent PSU relay control to control a power supply unit (PSU) relay of an information handling system, e.g., to control operation of the PSU relay when the information handling system is entering, operating within and exiting the modern standby (S0ix) state.

It will also be understood that one or more of the tasks, functions, or methodologies described herein (e.g., including those described herein for components 110, 130, 140, 150, 152, 154, 160, 170, 180, 186, 190, 192, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more blocks of the present methodologies may be employed in one or more code segments of the computer program. For example, a code segment executed by the information handling system may include one or more blocks of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:
1. An information handling system, comprising:
  a power supply unit comprising a mechanical relay and a first programmable integrated circuit, the first programmable integrated circuit being programmed to control operation of the mechanical relay to selectively provide electrical power to one or more power-consuming components of the information handling system;

a host programmable integrated circuit programmed to control power state transitions for the information handling system, the host programmable integrated circuit being programmed to transition the information handling system from a higher power state to a lower power state; and a second programmable integrated circuit coupled to the host programmable integrated circuit and the power supply unit;

where the second programmable integrated circuit is programmed to respond to the transition of the information handling system from the higher power state to the lower power state by providing at least one first command signal to the first programmable integrated circuit to cause the first programmable integrated circuit to control the mechanical relay to turn off and remain turned off while the information handling system operates in the lower power state.

2. The information handling system of claim 1, where the host programmable integrated circuit is programmed to provide a first signal to transition the information handling system from the higher power state to the lower power state; and where the information handling system further comprises:

a platform controller hub coupled to the host programmable integrated circuit and the power supply unit, where the platform controller hub receives the first signal from the host programmable integrated circuit and de-asserts a power supply on signal provided to the power supply unit in response to receiving the first signal provided by the host programmable integrated circuit, and where the power supply on signal then toggles on and off one or more times while the information handling system operates in the lower power state;

where the second programmable integrated circuit is coupled to the platform controller hub and where the platform controller hub provides the first signal to the second programmable integrated circuit;

where the second programmable integrated circuit receives the first signal from the platform controller hub and is programmed to respond to receiving the first signal from the platform controller hub by providing the at least one first command signal to the first programmable integrated circuit within the power supply unit; and where the first programmable circuit is programmed to respond to receipt of the at least one first command signal from the second programmable integrated circuit by ignoring the power supply on signal received from the platform controller hub, and by providing a control signal to the mechanical relay to control the mechanical relay to turn off and remain turned off while the information handling system operates in the lower power state.

3. The information handling system of claim 2, where the host programmable integrated circuit is programmed to provide a second signal to transition the information handling system from the lower power state to the higher power state; where the platform controller hub asserts the power supply on signal provided to the power supply unit in response to receiving the second signal provided by the host programmable integrated circuit, and where the power supply on signal is asserted while the information handling system operates in the higher power state.

4. The information handling system of claim 3, where the second programmable integrated circuit is coupled to the platform controller hub the platform controller hub provides the second signal to the second programmable integrated circuit, and the second programmable integrated circuit is programmed to respond to receiving the second signal from the platform controller hub by providing at least one second command signal to the first programmable integrated circuit within the power supply unit; and where the first programmable circuit is programmed to respond to receipt of the at least one second command signal from the second programmable integrated circuit by utilizing the power supply on signal supplied to the power supply unit by the platform controller hub to control the operation of the mechanical relay.

5. The information handling system of claim 4, where the second programmable integrated circuit is coupled to provide the at least one first command signal and the at least one second command signals to the first programmable integrated circuit within the power supply unit over a data bus that couples the second programmable integrated circuit to the power supply unit.

6. The information handling system of claim 1, where the lower power state is a modern standby (S0ix) power state and the higher power state is a working (S0) state.

7. The information handling system of claim 6, where the at least one first command signal from the second programmable integrated circuit to the first programmable integrated circuit causes the first programmable integrated circuit to control the mechanical relay to turn off and to remain turned off with the power supply unit in a steady state while the information handling system operates in the modern standby (S0ix) power state.

8. The information handling system of claim 1, where the host programmable integrated circuit is further programmed to transition the information handling system from the lower power state to the higher power state.

9. The information handling system of claim 8, where the lower power state is a modern standby (S0ix) power state and the higher power state is a working (S0) state.

10. The information handling system of claim 1, where the first programmable integrated circuit is a microcontroller integrated within the power supply unit; and where the second programmable integrated circuit is an out-of-band (OOB) programmable integrated circuit.

11. A method, comprising operating at least one programmable integrated circuit of an information handling system to:

control operation of a mechanical relay of a power supply unit of the information handling system to selectively provide electrical power from the power supply unit to one or more power-consuming components of the information handling system;

de-assert a power supply on signal provided to the power supply unit when the information handling system transitions from a higher power state to a lower power state, the power supply on signal then toggling on and off one or more times while the information handling system operates in the lower power state;

respond to the transition of the information handling system from the higher power state to the lower power state by providing at least one first command signal to the power supply unit; and respond to the receipt of the at least one first command signal in the power supply unit by ignoring the power on supply signal supplied to the power supply unit and controlling the mechanical relay to turn off and remain turned off while the information handling system operates in the lower power state.

12. The method of claim 11, where the lower power state is a modern standby (S0ix) power state and the higher power state is a working (S0) state.

13. The method of claim 12, further comprising operating the at least one programmable integrated circuit to respond to the receipt of the at least one first command signal in the power supply unit by providing a control signal to the mechanical relay to turn off and to remain turned off with the power supply unit in a steady state while the information handling system operates in the modern standby (S0ix) power state.

14. The method of claim 11, where the power supply unit comprises a first programmable integrated circuit; and where the method further comprises:
   operating the first programmable integrated circuit to control the operation of the mechanical relay to selectively provide the electrical power from the power supply unit to the one or more power-consuming components of the information handling system; and
   operating a second programmable integrated circuit to provide the at least one first command signal to the first programmable integrated circuit of the power supply unit over a data bus that couples the second programmable integrated circuit to the power supply unit.

15. The method of claim 11, further comprising operating the at least one programmable integrated circuit to assert the power supply on signal provided to the power supply unit in response to the information handling system transitioning from the lower power state back to the higher state, where the power supply on signal is asserted while the information handling system operates in the higher power state.

16. The method of claim 15, where the lower power state is a modern standby (S0ix) power state and the higher power state is a working (S0) state.

17. The method of claim 15, further comprising operating the at least one programmable integrated circuit to respond to the transition of the information handling system from the lower power state to the higher power state by providing at least one second command signal to the power supply unit.

18. The method of claim 17, further comprising operating the at least one programmable integrated circuit to respond to the receipt of the at least one second command signal in the power supply unit by utilizing the power on supply signal provided to the power supply unit to control the operation of the mechanical relay.

19. The method of claim 17, where the power supply unit comprises a first programmable integrated circuit; and where the method further comprises:
   operating the first programmable integrated circuit to control operation of the mechanical relay to selectively provide the electrical power to the one or more power-consuming components of the information handling system; and
   operating a second programmable integrated circuit to provide the at least one second command signal to the first programmable integrated circuit of the power supply unit over a data bus that couples the second programmable integrated circuit to the power supply unit.

20. The method of claim 19, where the first programmable integrated circuit is a microcontroller integrated within the power supply unit; and where the second programmable integrated circuit is an out-of-band (OOB) programmable integrated circuit.

* * * * *